UNITED STATES PATENT OFFICE.

THOMAS H. JENKINS, OF NEW YORK, N. Y.

IMPROVED SUBSTANCE FOR MAKING CUTLERY, EDGE-TOOLS, &c.

Specification forming part of Letters Patent No. 51,724, dated December 26, 1865.

*To all whom it may concern:*

Be it known that I, THOMAS H. JENKINS, of the city, county, and State of New York, have discovered, invented, and produced a new substance suitable for making cutlery, edge-tools, and other kinds of hardware and other articles requiring toughness and the hardness of steel; and I do hereby declare that the following is a full, clear, and exact description thereof.

I have discovered that when the substance known in the arts as malleable cast-iron is submitted to a certain process, to be hereinafter described, it acquires entirely new properties never heretofore found in malleable cast-iron. It is rendered more tough and becomes as hard as hardened steel, so that articles requiring such properties, and which heretofore have been made of steel, and which could only be made of steel at great expense, can be produced of this new substance at much less cost, as they can be cast of the form required, subjected to the usual and well-known process of rendering cast-iron malleable, and then subjected to the process to be hereinafter described, which imparts to it the new and required properties of toughness and steel-like property of hardness.

The articles desired to be produced are cast of the form desired in the usual way of cast-iron, and then treated in the usual way for producing what is well known as "malleable cast-iron," and then, whether in the rough or smooth state, I heat them to what is known as a "cherry-red" heat, and at or about that heat hammer them to compact the metal. After this I heat them up again to a cherry-red heat if during the hammer operation the temperature has been materially reduced. I then sprinkle over the surface of them a composition consisting of seven parts, by weight, of prussiate of potash and one part by weight of charcoal well pulverized and mixed, and again subject them to heat until the said composition disappears, taking care to heat them up again to about a cherry-red heat, and at that heat plunge them in a liquid bath composed of about twenty-eight gallons of water, eight pounds of oil of vitriol, forty-four ounces of sal-ammoniac, twenty ounces of Glauber's salts, and thirty ounces of common table-salt. When taken out of this solution the malleable iron will be found to have been materially changed in its properties, to have become tough and as hard as hardened steel. The quantity of the solution to be used will of course depend upon the size and form of the articles to be treated. And although I have herein specified the process which I have used with success for imparting the said properties to malleable cast iron, I do not wish to be understood as making claim herein to the said process; but What I do claim as my invention, and desire to secure by Letters Patent, is—

The new substance herein described, produced from malleable cast-iron by the process herein described or any process equivalent thereto.

THO. H. JENKINS.

Witnesses:
ANDREW DE LACY,
M. M. LIVINGSTON.